(12) United States Patent
Feldman

(10) Patent No.: US 6,393,000 B1
(45) Date of Patent: May 21, 2002

(54) COMMUNICATION METHOD AND APPARATUS WITH TRANSMISSION OF A SECOND SIGNAL DURING ABSENCE OF A FIRST ONE

(75) Inventor: Howard Ray Feldman, Kenton (GB)

(73) Assignee: Inmarsat, Ltd., London (GB)

( * ) Notice: Subject to any disclaimer, the term of this patent is extended or adjusted under 35 U.S.C. 154(b) by 0 days.

(21) Appl. No.: 08/817,919

(22) PCT Filed: Oct. 27, 1995

(86) PCT No.: PCT/GB95/02533

§ 371 Date: Jul. 23, 1997

§ 102(e) Date: Jul. 23, 1997

(87) PCT Pub. No.: WO96/13916

PCT Pub. Date: May 9, 1996

(30) Foreign Application Priority Data

Oct. 28, 1994 (GB) .............................................. 9421794

(51) Int. Cl.⁷ .............................. H04B 7/185; H04J 3/17

(52) U.S. Cl. ....................................... 370/316; 370/528

(58) Field of Search ................................. 370/527, 528, 370/529, 522, 433, 435, 349, 312, 313, 316, 493, 494, 495; 455/430

(56) References Cited

U.S. PATENT DOCUMENTS

| | | | | |
|---|---|---|---|---|
| 5,121,385 A | | 6/1992 | Tominaga et al. ........... | 370/435 |
| 5,327,461 A | * | 7/1994 | Kushige ...................... | 375/244 |
| 5,528,664 A | * | 6/1996 | Slekys et al. ................ | 455/452 |
| 5,740,531 A | * | 4/1998 | Okada ......................... | 455/403 |
| 5,740,542 A | * | 4/1998 | Leeper et al. ................ | 455/516 |
| 5,781,595 A | * | 7/1998 | Fuji ............................ | 375/357 |
| 5,812,545 A | * | 9/1998 | Liebowitz et al. ........... | 370/337 |

FOREIGN PATENT DOCUMENTS

| | | |
|---|---|---|
| EP | 0 082 333 | 6/1983 |
| EP | 0 501 485 A2 | 9/1992 |
| GB | 1005075 | 9/1965 |
| GB | 2 006 574 A | 5/1979 |
| GB | 2 193 862 A | 8/1986 |
| GB | 2 232 562 A | 5/1989 |

* cited by examiner

*Primary Examiner*—Melvin Marcelo
*Assistant Examiner*—Soon-Dong Hyun
(74) *Attorney, Agent, or Firm*—Banner & Witcoff, Ltd.

(57) ABSTRACT

A network station receives a principal signal and data. When the principal signal is present or contains information it is transmitted to a receiving station through a communications channel. When the principal signal is absent or does not have a significant information content, the network station transmits the data through the same communications channel in a format such that the data is received and output by a further receiving station.

22 Claims, 9 Drawing Sheets

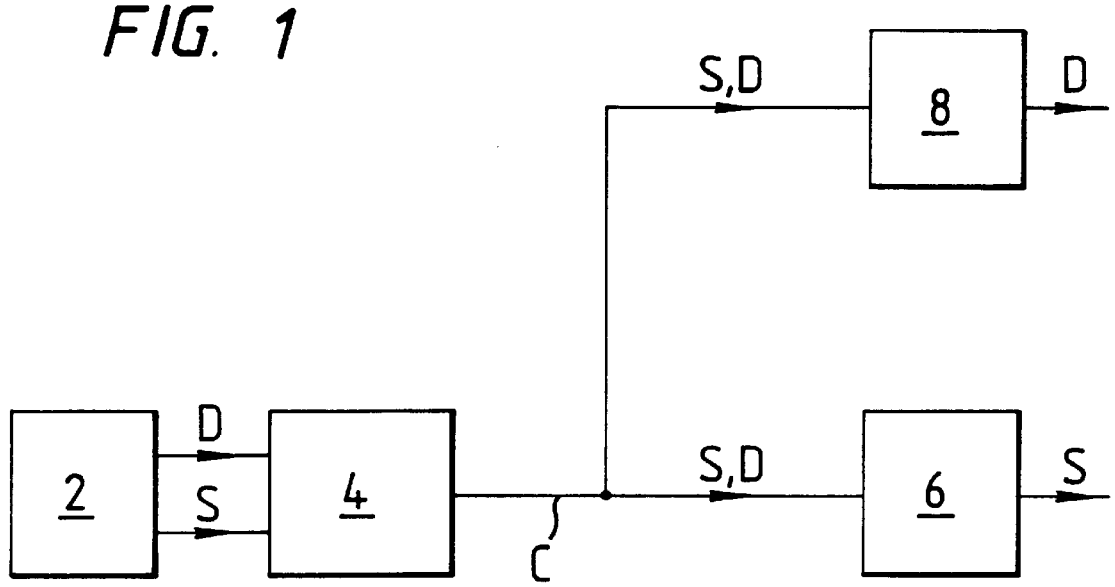
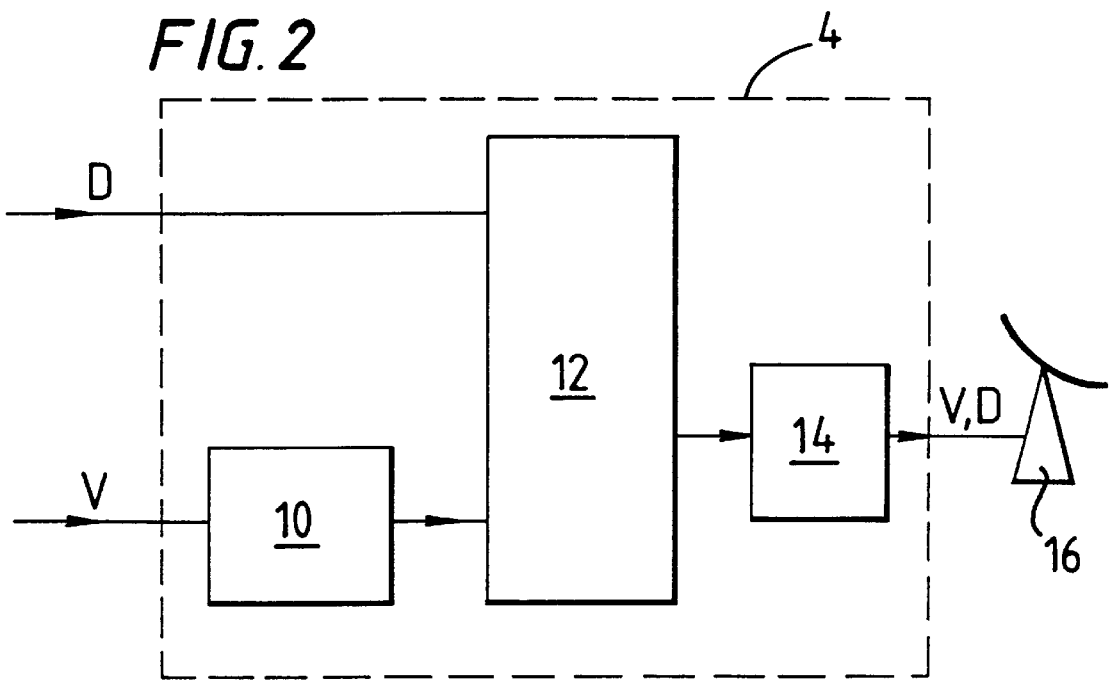

COMMUNICATION METHOD AND APPARATUS WITH TRANSMISSION OF A SECOND SIGNAL DURING ABSENCE OF A FIRST ONE

TECHNICAL FIELD

The present invention relates to a communication method and apparatus, and particularly but not exclusively to a method and apparatus for providing data communication over a radio frequency channel in addition to voice, image or other data communication.

BACKGROUND ART

In a known radio frequency communication system, for example the INMARSAT-A (TM) Satellite Communication System, as described for example in "Satellite Communications: Principles and Applications", Calcutt and Tetley, 1st edition 1994, users are connected to a public service telephone network (PSTN) through a satellite link to provide voice, facsimile and circuit switched data communication services. Attempts have been made to add a packet switched data service, in which users share a single channel, to the existing services available through INMARSAT-A. However, this requires the allocation of additional traffic channels, which adds to the cost of the system.

The document GB-A-2 232 562 describes a digital mobile telephone system with a data communications function. If a data communication is asymmetric, time slots which are not needed for communication in one direction are reassigned for data transmission in the opposite direction. The time slots may be reassigned to a different data terminal. However, such a system requires reallocation of part of a physical channel assigned for communication in one direction so as to change the direction and/or data terminal to which that part is assigned.

DISCLOSURE OF INVENTION

According to one aspect of the present invention there is provided a communication system in which a first station is arranged selectively to transmit a principal signal and a data signal. The first station establishes a communication channel to a second station and begins to transmit the principal signal to the second earth station. However, during a period in which no information can be transmitted to the second station, the first station transmits the data signal in such a way that it may be decoded by a third station and may also be received by the second station without affecting the information decoded by the second station.

During voice communication, a proportion of the time during which a channel is kept open is unused, for example when a user is listening without talking, so that the user's transmit channel carries only noise. Likewise, in a facsimile communication, a terminal which receives facsimile data only transmits during the handshaking phases of the communication; at other times its transmit channel is unused.

In embodiments of the invention the available bandwidth of the communication channel is used with greater efficiency, and a data communication service may be provided concurrently with another service.

Preferably, the principal signal comprises a voice or facsimile signal.

Where the principle signal is a voice signal, the data signal is transmitted during periods of silence. The first earth station may transmit a silence code which is decoded by the second earth station to reproduce silence or low-level noise during a voice communication. Preferably, the third earth station interprets the silence code as a signal to receive data.

Alternatively, the first earth station may transmit a signal which is reproduced by the second earth station as acceptable (e.g. low-level) noise or silence but which is decoded by the third earth station as data, during the periods of silence.

Where the principal signal is a facsimile signal, the first station may detect whether the second earth station is transmitting facsimile data and therefore does not need to receive any facsimile data. The first station transmits the signal including the data signal in such a way that it does not activate the facsimile terminal at the second earth station, but activates the third earth station to receive data.

By the above measures, the second and third stations may receive data concurrently, with the second earth station only decoding the principal signal and the third earth station only decoding the data, but without interference between the signals. This aspect of the present invention extends in particular to the first station, the third station, apparatus within the first or third station which implement the essential features of the present invention and any method performed by such apparatus.

According to another aspect of the present invention, there is provided a method of encoding data not derived from a voice signal such that it appears to relate to a voice signal to a voice decoder but can be decoded to reproduce the data by a data decoder, and apparatus for performing said method.

According to another aspect of the present invention, there is provided a method in which a duplex channel assigned to a facsimile communication is shared so that, when a facsimile terminal is transmitting facsimile data in one direction, data is transmitted in the other direction for decoding by a data decoder in such a way that the facsimile terminal is not interrupted by the data.

BRIEF DESCRIPTION OF DRAWINGS

Specific embodiments of the present invention will now be described with reference to the accompanying drawings in which:

FIG. 1 is a diagram showing the logical connection between earth stations in embodiments of the present invention;

FIG. 2 is a functional block diagram of a land earth station according to a first embodiment;

MODES FOR CARRYING OUT THE INVENTION

Figure 3:
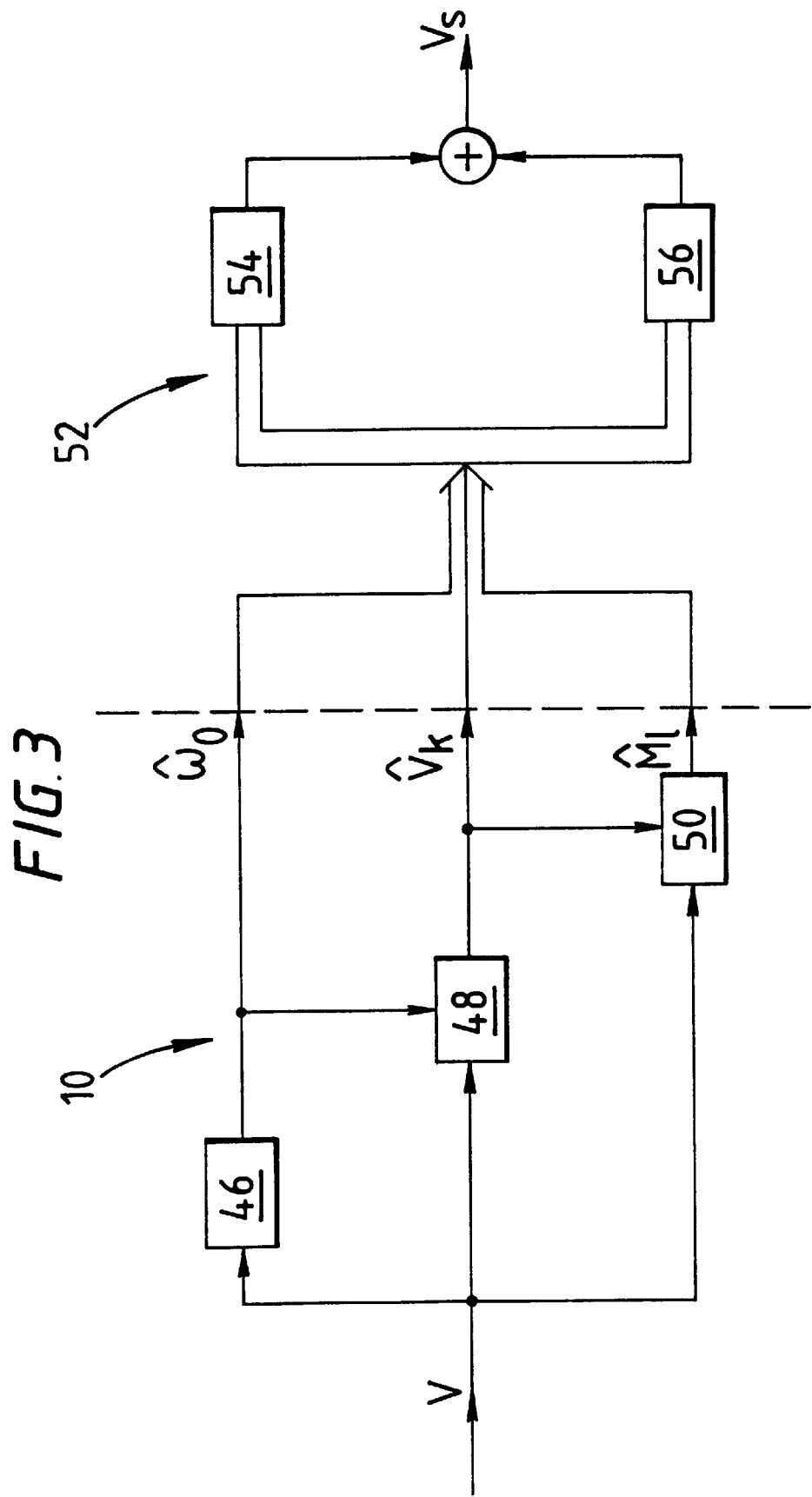
FIG. 3 is a block diagram of a voice codec according to the first embodiment.
Figure 4:
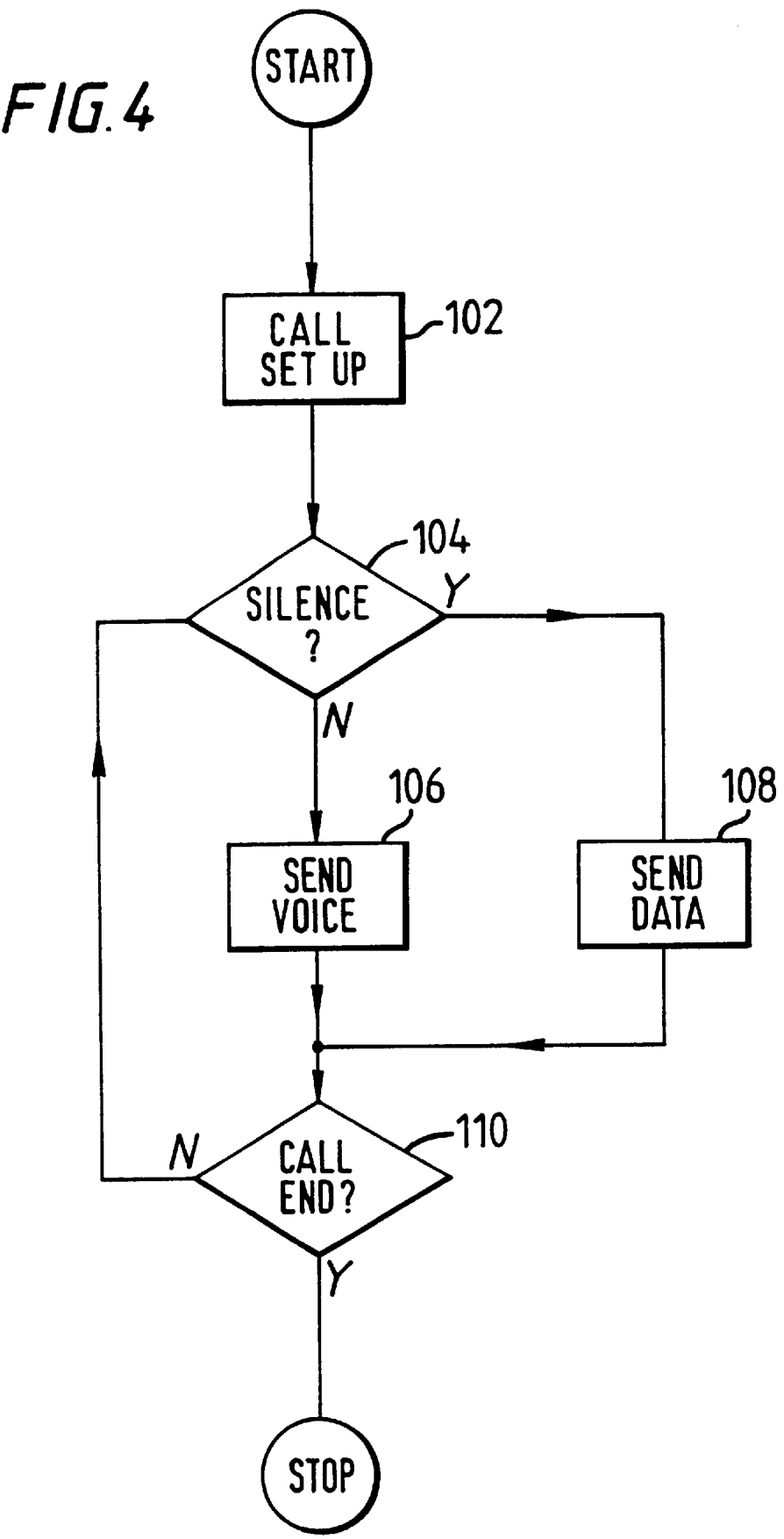
FIG. 4 is a flowchart of the operation of the land earth station.

FIG. 1 shows schematically a communication system in which a network station, such as a land earth station (LES) 4 is connected to a public service telephone network (PSTN) 2. The LES 4 is arranged to provide a satellite link between a number of users connected to the PSTN 2 and a number of user terminals, such as mobile earth stations (MES) which are able to receive and decode signals S transmitted by the LES 4 via a satellite, and to encode and transmit signals to the LES 4 via the satellite. FIG. 1 shows a first MES 6 and a second MES 8, both in communication with the LES 4 by means of a single channel C.

The nature of the channel C depends on the addressing technique used. For example, in a single channel per carrier (SCPC) system, a channel corresponds to a single carrier frequency in a half duplex system or a pair of carrier frequencies in a full duplex system. In a TDMA system, a channel corresponds to a predetermined time slot in a repeating time frame of a transmission at a particular frequency or set of frequencies. In a CDMA system, a channel corresponds to a transmission encoded with a predetermined code. The present invention does not depend on the addressing system used.

The LES 4 also receives data D, addressed to the second MES 8, from the PSTN 2. The data D is stored at the LES 4 until it can be transmitted. The data D may alternatively have been entered directly at the LES 4 or previously received from an MES.

In order to establish a communications link with the first MES 6, the LES 4 transmits a predetermined calling code identifying the first MES 6 on an LES signalling channel. The calling code includes a service-type code which identifies whether a voice, facsimile or data transmission is to follow. The first MES 6 acknowledges the calling code on an MES signalling channel if it is ready to communicate. A communications link is then allocated by an independent network control station.

If the LES 4 receives data D addressed to the second MES 8, it transmits a predetermined data addressing code on the LES signalling channel and the second MES 8 acknowledges the data addressing code if it is ready to receive the data. The data addressing code includes information on the communication link which will be used for data transmission.

A first embodiment of the present invention will be described with reference to FIGS. 1 to 7. In this embodiment, a packet switched data service is provided in addition to a voice communication service such as the INMARSAT-M (TM) system as also described in the Calcutt and Tetley reference above.

First, a call is set up between the LES 4 and the first MES 6 (step 102). The call may be initiated by either the LES 4 or the first MES 6.

During the call, a voice signal V is received from the PSTN 2 by a codec 10 of the LES 4. Details of the codec 10 used in the INMARSAT-M (TM) system are described for example in the Calcutt and Tetley reference. This codec 10 uses an Improved Multi-Band Excitation (IMBE) algorithm, shown schematically in FIG. 3. The voice signal V is analysed by a pitch estimation stage 46 which estimates the fundamental frequency $\overline{\omega}_o$ of the voice signal V. A voiced/unvoiced determination state 48 evaluates the voicing measure of each of a number of non-overlapping frequency bands of the voice spectrum and generates a set of decisions $\hat{V}_k$ as to whether the voice signal V is voiced or unvoiced in each band. A spectral amplitude estimation stage 50 determines the spectral envelope $\hat{M}_1$ of each frequency band according to whether the band is determined to be voiced or unvoiced. The values $\overline{\omega}_c, \hat{V}_k, \hat{M}_1$ are encoded for each 20 ms frame of speech to form a series of vectors $U_0$ to $U_7$. Error correction information is added prior to radio frequency modulation and transmission.

However, if the codec 10 does not detect any vocal characteristics in the voice signal V, it sets the first six bits of vector $U_0$ to 110010 (decimal 50) to form a silence code.

In the first MES 6, another codec 52 decodes the values of $\overline{\omega}_o, \hat{V}_k$ and $\hat{M}_1$ and synthesises unvoiced and voiced speech signals at unvoiced speech synthesizer 54 and voiced speech synthesizer 56 respectively. The outputs of the synthesizers 54 and 56 are added to produce a synthesised speed signal $V_S$. Alternatively, if the codec 52 receives the silence code, it generates low level "comfort" noise and does not decode any other information.

The LES 4 includes a packet data interface unit 12 which normally receives encoded data from the codec 10 and sends the encoded data (step 106) to a radio frequency (RF) modulator 14 for transmission by an antenna 16 to a satellite (not shown). The first MES 6 includes a demodulator for demodulating the signal received from the LES 4.

Figure 7:
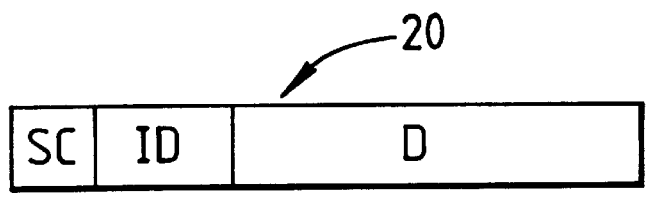
FIG. 7 shows the format of a packet transmitted by the land earth station according to the first embodiment.
Figure 8:
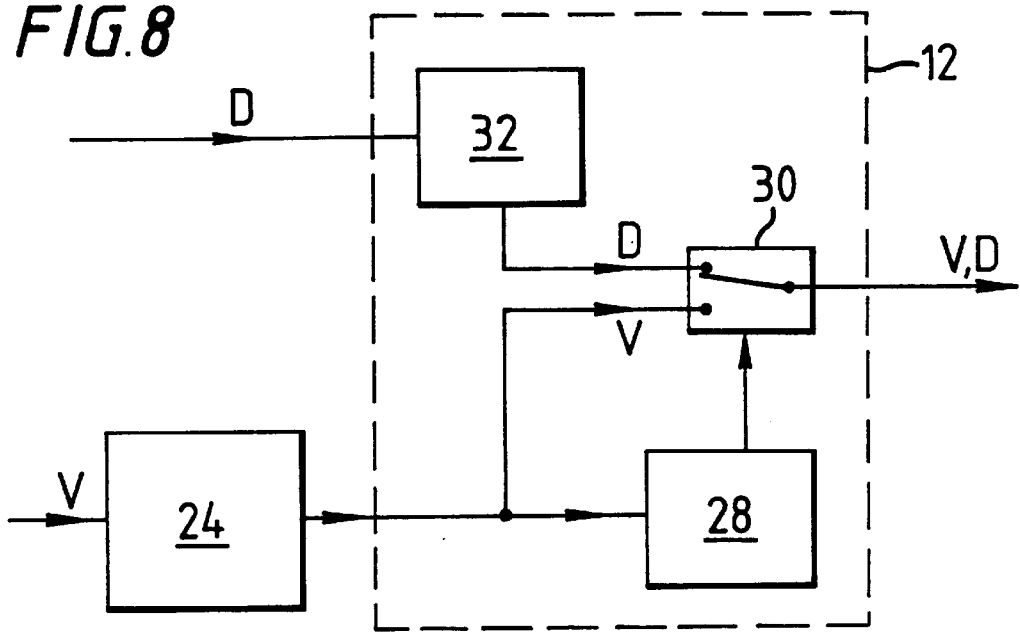
FIG. 8 is a functional block diagram of a packet data interface unit according to a second embodiment.

However, when the packet data interface unit 12 receives a silence code from the codec 10 (step 104), it outputs the data D (step 108) in a data packet 20 as shown in FIG. 7. The data packet 20 includes a silence code SC, an identity code ID which identifies the second MES 8 to which the data is to be sent, and the data D itself. The data packet 20 is transmitted via the satellite and is receives by both the first MES 6 and by the second MES 8. The process repeats until the call is ended (step 110).

The first MES 6 is set up to receive a voice communication and therefore responds to the silence code SC by ignoring the rest of the data packet 20. Low level white noise (or other "comfort noise") is generated by the codec 52 at the first MES 6 in response to the silence code SC to reassure the user that the communications channel is still open.

Figure 5:
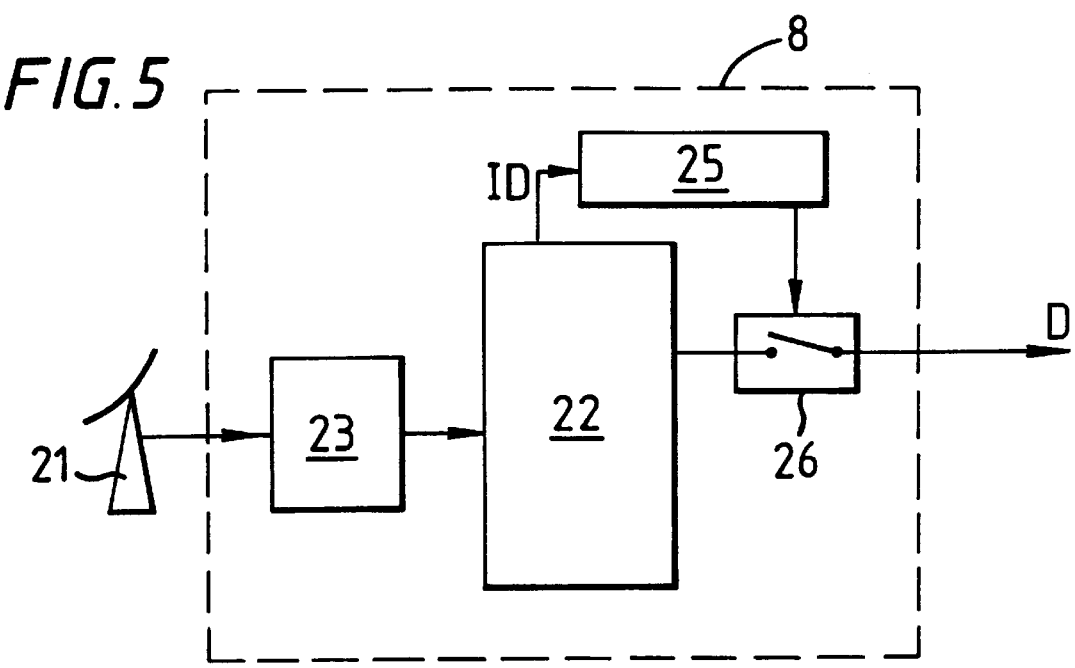
FIG. 5 is a functional block diagram of a second mobile earth station.
Figure 6:
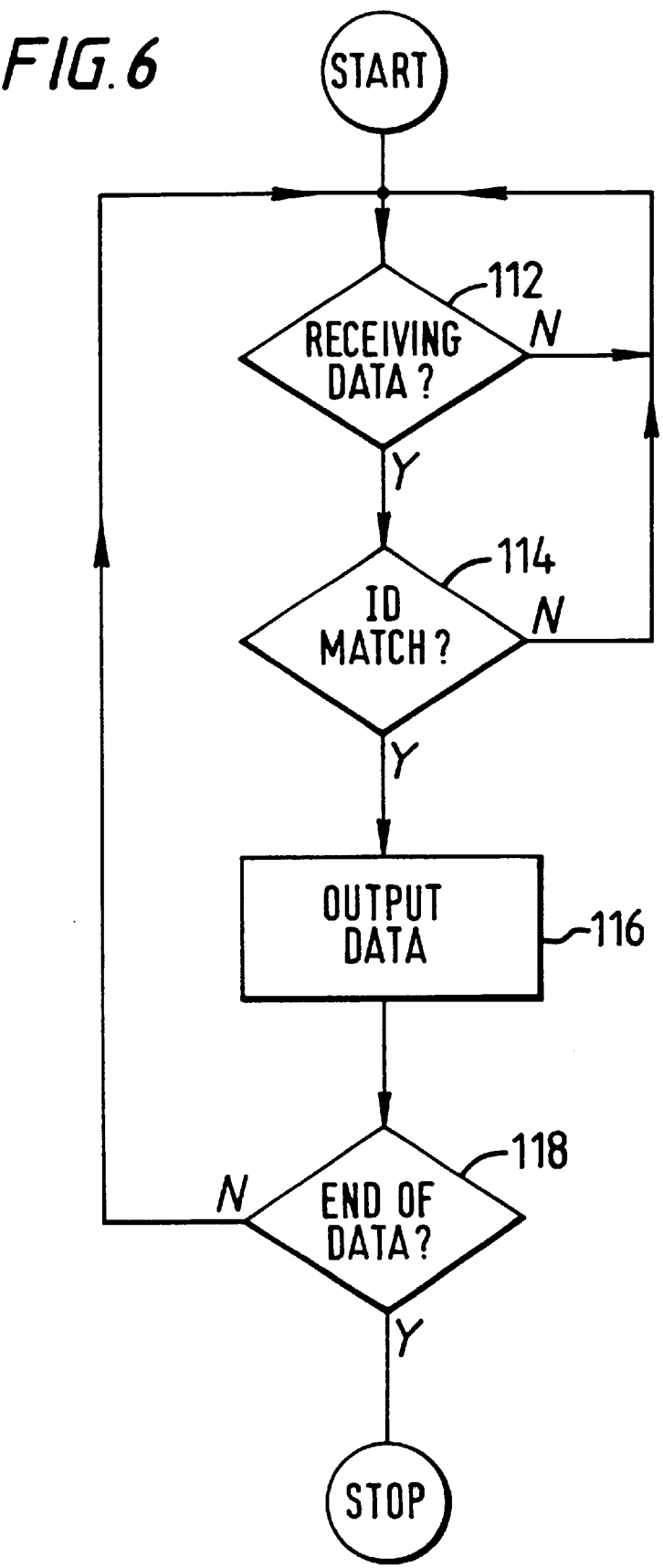
FIG. 6 is a flowchart of the operation of the second mobile earth station.
Figure 9:
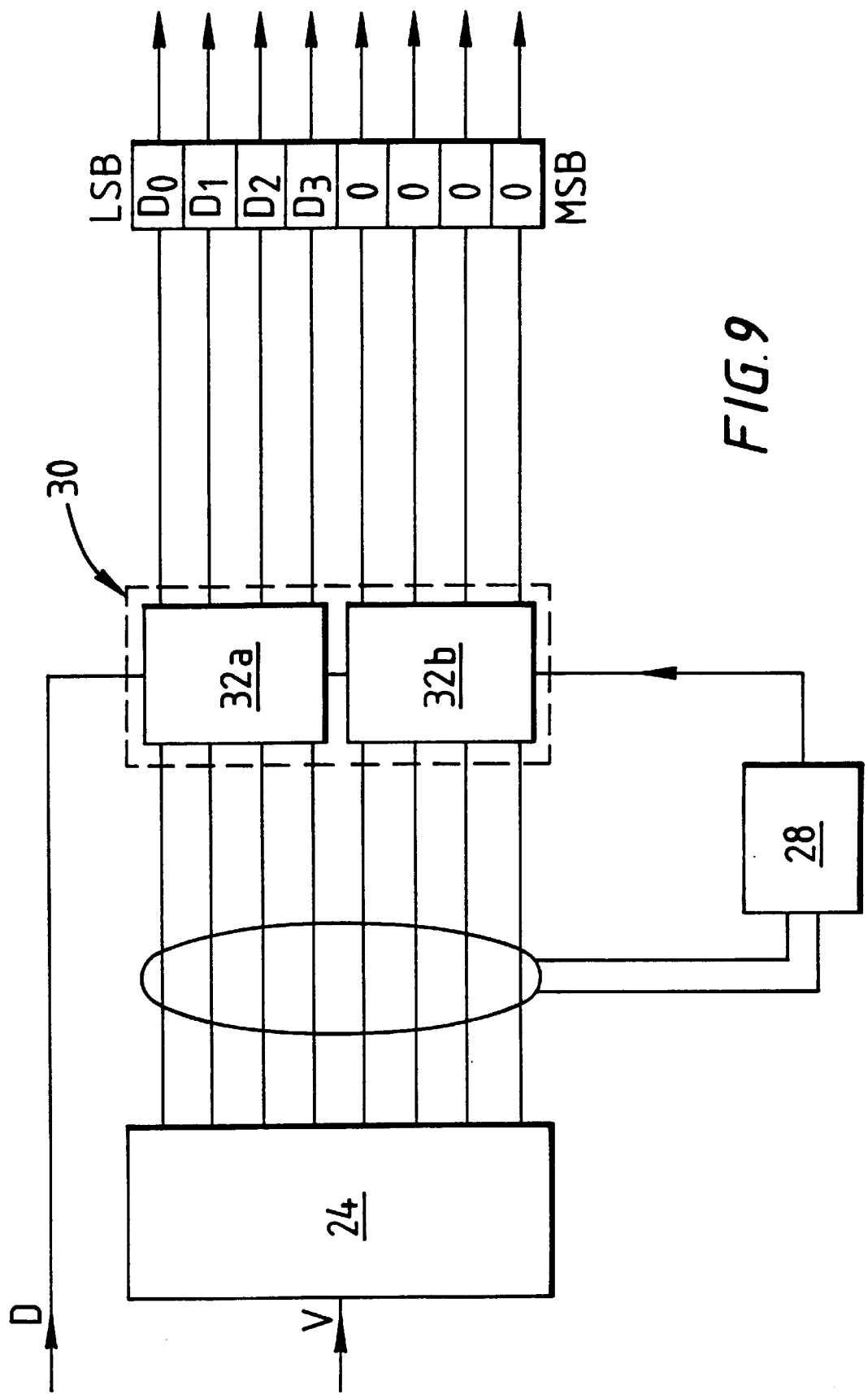
FIG. 9 is a block diagram of the packet data interface unit including a PCM codec.
Figure 10:
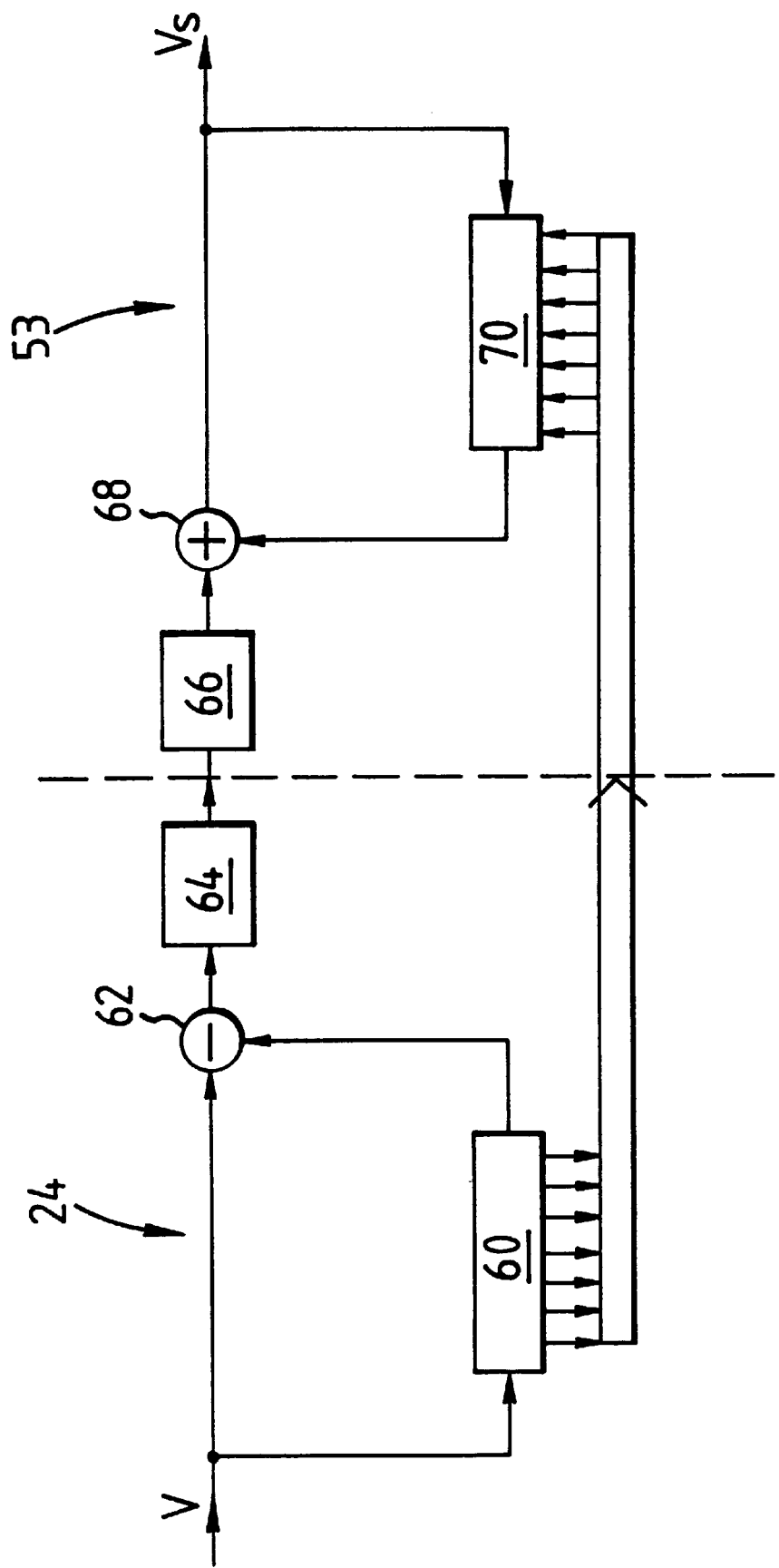
FIG. 10 is a schematic diagram of an APC coder and decoder.

In the second MES 8, as shown in FIG. 5 and in the flowchart of FIG. 6, the data packet 20 is received by an antenna 21, RF demodulated by an RF demodulator 23 and decoded by a decoder 22 which detects whether data is being sent (step 112), by detecting the presence of the silence code SC. The decoder 22 extracts the identifying code ID and compares it with a code stored in a comparator 25 (step 114). If the codes match, the comparator 25 closes a data switch 26 and the decoder 22 outputs the data D (step 116). The data D is output to a local network or storage device, such as an e-mail system. The process continues until the last block of data D is received (step 118).

A second embodiment will now be described with reference to FIGS. 4 to 6 and 8 to 10. This embodiment is applicable to a system which uses a codec 24 that does not provide silence detection, such as for example the INMARSAT-B (TM) system.

The LES 4 in this embodiment includes a packet data interface unit 12 having a voice activity detector (VAD) 28 which detects whether the output of the codec 24 represents only background noise (step 104). An example of this type of detector, (suitable for an LPC codec used in the GSM system) is described in U.S. Pat. No. 5,276,765. The VAD 28 activates a switch 30 which switches the output of the packet data interface unit 12 from the output of the codec 24 (step 106) to the signal D (step 108) if no voice is detected.

In this embodiment the data D must be encoded so as to be acceptable for acoustic reproduction by the first mobile earth station 6, since the first MES 6 is not arranged to recognise a silence code and so cannot ignore a received signal as in the first embodiment. The data D is therefore encoded by a data decoder 32 to represent low level noise to the codec of the first MES 6.

The technique used by the data encoder 32 depends on the type of codec used by the first MES 6. In one example, shown in FIG. 9, the codec 24 uses 8-bit pulse code modulation (PCM). The VAD 28 receives the output of the codec 24 and analyses whether a voice is present. The data encoder 32 comprises a first functional section 32$a$ which encodes the data D into the four least significant bits (LSB) ($D_{0\ to\ 3}$) in response to an output of the VAD 28 indicating that no voice is present and a second functional section 32$b$ which outputs zeros as the four most significant bits (MSB) in response to the output of the VAD 28, so that the decoded output signal sounds like low-level noise. The first and second functional sections 32$a$, 32$b$ allow the output of the codec 24 to pass when the VAD 28 outputs a signal indicating that a voice is present. Alternatively the data D may be spread-spectrum encoded by the functional section 32$a$ so as to sound like low-level noise. In another alternative, shown in FIG. 10, the codec 24 uses adaptive predictive coding (APC) as in the INMARSAT-B system. In an APC coder, a predictor 60 generates an estimation of the input speech signal V in terms of a set of short term reflection coefficients, long term coefficients and an optimum r.m.s. scaling value. The output of the predictor 60 is subtracted from the actual voice signal by a subtracter 62 and the residual signal is output to a quantizer 64. The coefficients and the quantized residual signal are transmitted. In an APC decoder 53, the quantized residual signal is sent to an inverse quantizer 66 while the coefficients are sent to another predictor 70 so as to reconstruct the speech signal $V_S$. Selected coefficients such as the reflection coefficients may be used to carry the data, while the remaining coefficients are set to zero so that no sound is generated at the codec 53 of the first MES 6.

Referring to FIGS. 5 and 6, in this embodiment the decoder 22 of the second MES 8 recognizes (step 112) an encoded sequence in the data encoded by the data encoder 32 and compares (step 114) the encoded sequence with a code stored in a comparator 25. If the encoded sequence matches the code, the comparator closes the data switch 26 and data D is output (step 116) from the second MES 8 as in the first embodiment.

Figure 11:
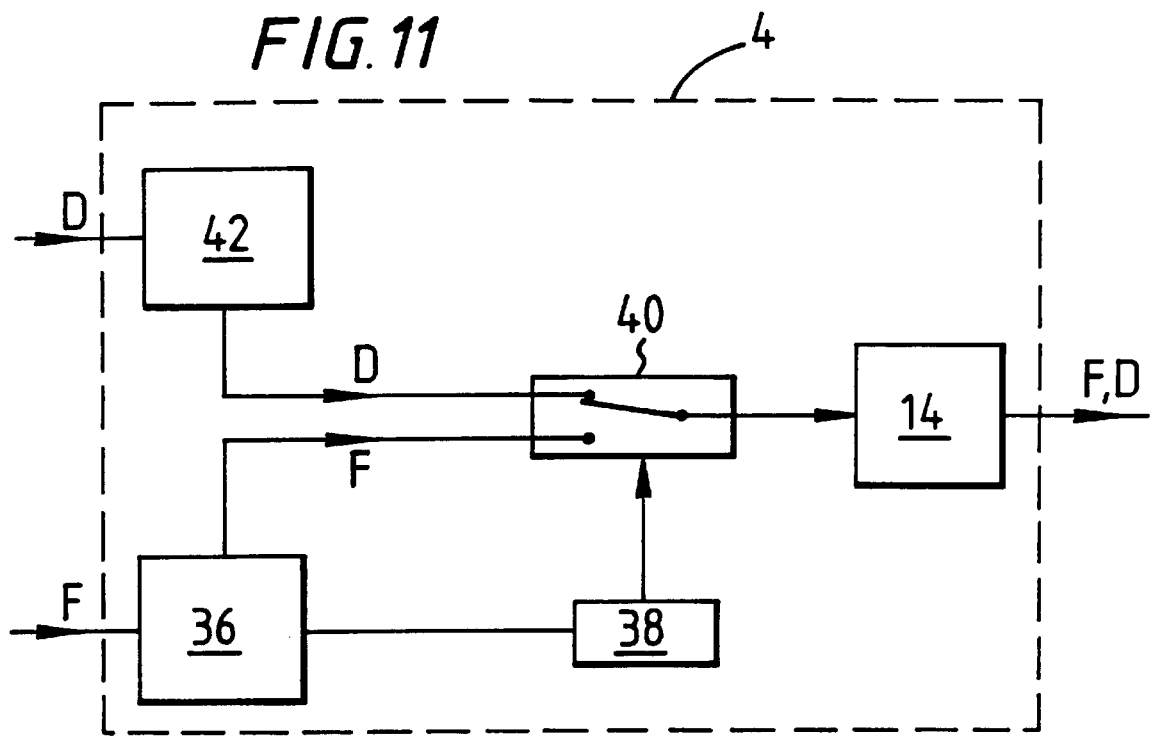
FIG. 11 is a functional block diagram of a land earth station according to a third embodiment.
Figure 12:
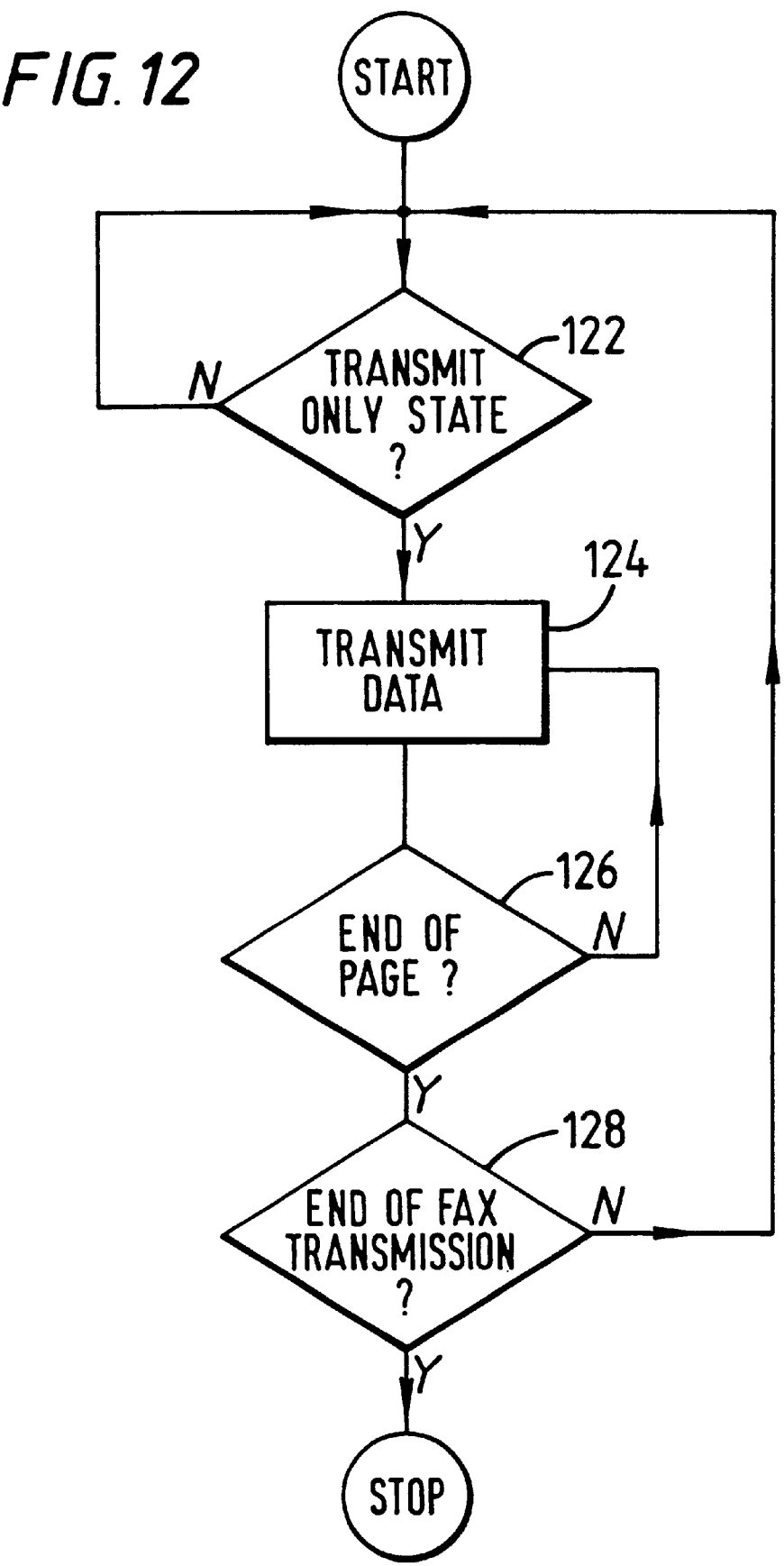
FIG. 12 is a flowchart of the operation of the land earth station according to the third embodiment.

A third embodiment will now be described with reference to FIGS. 11 to 13. In this case, the LES 4 is connected through the PSTN 2 to a receiving facsimile terminal which sends facsimile protocol signal and the first MES 6 is connected to a transmitting facsimile terminal which sends both protocol signal and facsimile data. The protocol signals may for example comply with CCITT (not ITU-T) recommendations T.30 and T.4. The protocol signals establish the communication mode of the terminals during a pre-message procedure, correct errors and indicate multiple pages during message transmission and signal and acknowledge the end of a transmission during a post-message procedure. Both facsimile terminals operate in half-duplex mode, so that they cannot receive data whilst they are transmitting. However, a full duplex link is set up between the LES 4 and the first MES 6, since the same channel type is used for voice and facsimile communication.

The LES 4 includes a facsimile interface unit (FIU) 36 which converts the facsimile protocol signals F from the PSTN 2 to data suitable for transmission by the radio frequency interface unit 14, and converts data received from the radio frequency interface unit 14 to facsimile signals suitable for sending through the PSTN 2. Such a facsimile interface unit is described for example in British Patent Publication No. 2286739 or International Patent Publication No. WO 92/02100.

A monitor 38 is connected to the FIU 36, so as to detect (step 122) when the FIU 36 is receiving or is about to receive facsimile data from the first MES 6. This may be done either by detecting the receipt of facsimile data from the first MES 6 or by identifying the end of the pre-message procedure or multi-page procedure by monitoring the protocol signals sent by the LES 4. For example, the monitor 38 may be activated by a CFR (confirmation to receive) signal sent by the LES 4.

The monitor 38 then activates a switch 40 which outputs the data D (step 124) to the radio frequency interface unit 14, for reception by the second MES 8. Successive blocks of data D are sent until the monitor 38 detects (step 126) the end of the transmission of the facsimile data by the first MES 6, for example by detecting an MPS (multipage signal) or EOM (end of message) signal from the first MES 6. If the message is to continue (step 128), the monitor 38 detects (step 122) when the first MES 6 is sending more data and again activates the switch 40.

The data D is encoded by a data encoder 42 arranged according to the type of communication system. In the INMARSAT-B (TM) system, the LES 4 sends an "idle" code to an MES while the MES is transmitting facsimile data, to indicate that no information is being sent from the LES 4. Therefore, the data encoder 42 for use with INMARSAT-B (TM) encodes the data in a format shown in FIG. 13, in which a data packet 44 includes an idle code IC, an identifying code ID and the data D. The first MES 6 receives this data packet, decodes the idle code IC and ignores the rest of the packet. Meanwhile, the second MES 8, as shown in FIG. 5, is activated when the decoder 22 receives the idle code IC. The decoder 22 then decodes the identifying code ID and outputs it to the comparator 24. The data switch 26 is activated to output the data D if the identifying code matches that stored in the comparator 25.

In an alternative system, such as the INMARSAT-M (TM) system, the receiving portion of the first MES 6 is automatically idle during facsimile data transmission, unless it receives a sequence of 72 consecutive "ones". Therefore, the data encoder 42 need only encode the data so as to avoid reproducing such a sequence. As before, the data encoder inserts an identifying code ID to identify the second mobile earth station 8 for which the data communication is intended.

The first MES 6 may also be operable to receive data in the same manner as the second MES 8 and the second MES 8 may also be operable to receive voice, facsimile or other signals in the same manner as the first MES 6.

Figure 13:
FIG. 13 is a diagram of the packet format of a signal transmitted by the land earth station according to the third embodiment of the present invention.

The data formats shown in FIGS. 7 and 13 do not necessarily correspond to the sequential order in which the data is transmitted. The blocks of data may be interleaved, to minimize the effect of short bursts of noise.

Although in the above embodiments the first MES 6 and the second MES 8 are physically separate, they may alternatively share some functional blocks and may be integrated in a single earth station. For example, the first MES 6 and the second MES 8 may share an aerial but have separate radio frequency demodulators and data decoding sections. The decoded voice, fax or data signals may be transmitted to the same network or storage device.

INDUSTRIAL APPLICABILITY

Although the above specific embodiments have been described with specific reference to the INMARSAT-M (TM) and INMARSAT-B (TM) systems, the present invention is also applicable to other communications systems in which it is possible for two users to receive a common channel. For example, the present invention is applicable to systems using radio links, such as satellite communications systems or terrestrial cellular systems. One such cellular system is a GSM (Special Mobile Group) standard system, which uses Time Division Multiple Access (TDMA) and incorporates silence detection.

The present invention may be advantageously applied to a TDMA system, by selective insertion of data packets in different time slots according to which channels are silent in each time frame. In this way, excessive delay in data transmission, caused by some channels being constantly unavailable, for example because of incessant talking on them, may be avoided. Thus, it can be seen that successive packets of a data transmission need not occupy the same channel, and may occupy more than one time slot in the same TDMA time frame.

Furthermore, the invention is not limited to use in voice or facsimile communications. For example, the principal signal may be a conditional replenishment image signal, in which the amount of image data per frame varies according to the variation between frames and the data signal could be transmitted with the image data when only a small quantity of image data need be sent.

The terms LES and MES are used purely by way of example and the invention is not limited to fixed, mobile, handheld, land-, sea- or air-based stations or terminals or any particular combination of the aforementioned.

The functional blocks shown in the accompanying drawings do not necessarily correspond to discrete physical units, but may be implemented in many ways known in the art.

What is claimed is:

1. A method of radio-frequency communication to separate first and second mobile terminals, the method comprising:

storing data for transmission to said second mobile terminal;

setting up a communication with said first mobile terminal via a radio-frequency channel;

detecting an absence of information in said communication; and transmitting one or more data packets derived from said data and addressed to said second mobile terminal in said radio-frequency channel during said absence.

2. A method as claimed in claim 1, wherein the one or more data packets are transmitted with a predetermined code indicative of said absence of information.

3. A method as claimed in claim 1, wherein the one or more data packets include data representative of said absence of information in a format arranged for decoding by the first mobile terminal.

4. A method as claimed in claim 1, wherein said communication is a voice communication.

5. A method as claimed in claim 1, wherein said channel is a duplex channel and the transmitting step comprises transmitting said one or more data packets while the first mobile terminal is in a transmit-only state.

6. A method as claimed in claim 5, wherein the transmit-only state of the first mobile terminal is determined by detecting a signal transmitted by the first mobile terminal, said signal being indicative of said transmit-only state.

7. A method as claimed in claim 5, wherein the transmit-only state of the first mobile terminal is determined by detecting a command signal transmitted to the first mobile terminal, which commands the mobile terminal to enter said transmit-only state.

8. A method as claimed in claim 1, wherein said communication is a facsimile communication.

9. A method as claimed in claim 1, wherein said one or more data packets are transmitted with a predetermined identifying code associated with said second mobile terminal.

10. A method as claimed in claim 1, wherein said radio-frequency channel is transmitted via satellite.

11. A method as claimed in claim 1, wherein sad radio-frequency channel is a terrestrial cellular channel.

12. Apparatus for radio-frequency communication to separate first and second mobile terminals, comprising:

storing means for storing data for transmission to said second mobile terminal;

set-up means for setting up a communication with said first mobile terminal via a radio-frequency channel, the communication comprising information not addressed to said second mobile terminal;

detecting means for detecting an absence of information in said communication; and transmitting means for transmitting one or more data packets derived from said data and addressed to said second mobile terminal in said radio-frequency channel during said absence.

13. Apparatus as claimed in claim 12, wherein said transmitting means is arranged to output said one or more data packets together with a predetermined code indicative of said absence of information.

14. Apparatus as claimed in claim 12, wherein said transmitting means is arranged to output said one or more data packets in a form representative of the absence of information.

15. Apparatus as claimed in claim 12, wherein said communication is a voice-type communication.

16. Apparatus as claimed in claim 12, including state detecting means for detecting a transmit-only state of the first mobile terminal, the transmitting means being operable to output the one or more data packets in response to detection of the transmit-only state by the state detecting means.

17. Apparatus as claimed in claim 16, wherein the state detecting means is operable to identify said transmit-only state by detecting a signal indicative of said transmit-only state, which is transmitted by the first mobile terminal.

18. Apparatus as claimed in claim 16, wherein the state detecting means is operable to identify said transmit-only state by detecting a command signal which is transmitted to the first mobile terminal to command the first mobile terminal to enter said transmit-only state.

19. Apparatus as claimed in claim 12, wherein said communication is a facsimile communication.

20. Apparatus as claimed in claim 12, wherein said one or more data packets include a predetermined identifying code associated with said second mobile terminal.

21. Apparatus as claimed in claim 12, wherein the channel is a satellite channel.

22. Apparatus as claimed in claim 12, wherein the channel is a terrestrial cellular channel.

* * * * *